United States Patent Office 3,597,190
Patented Aug. 3, 1971

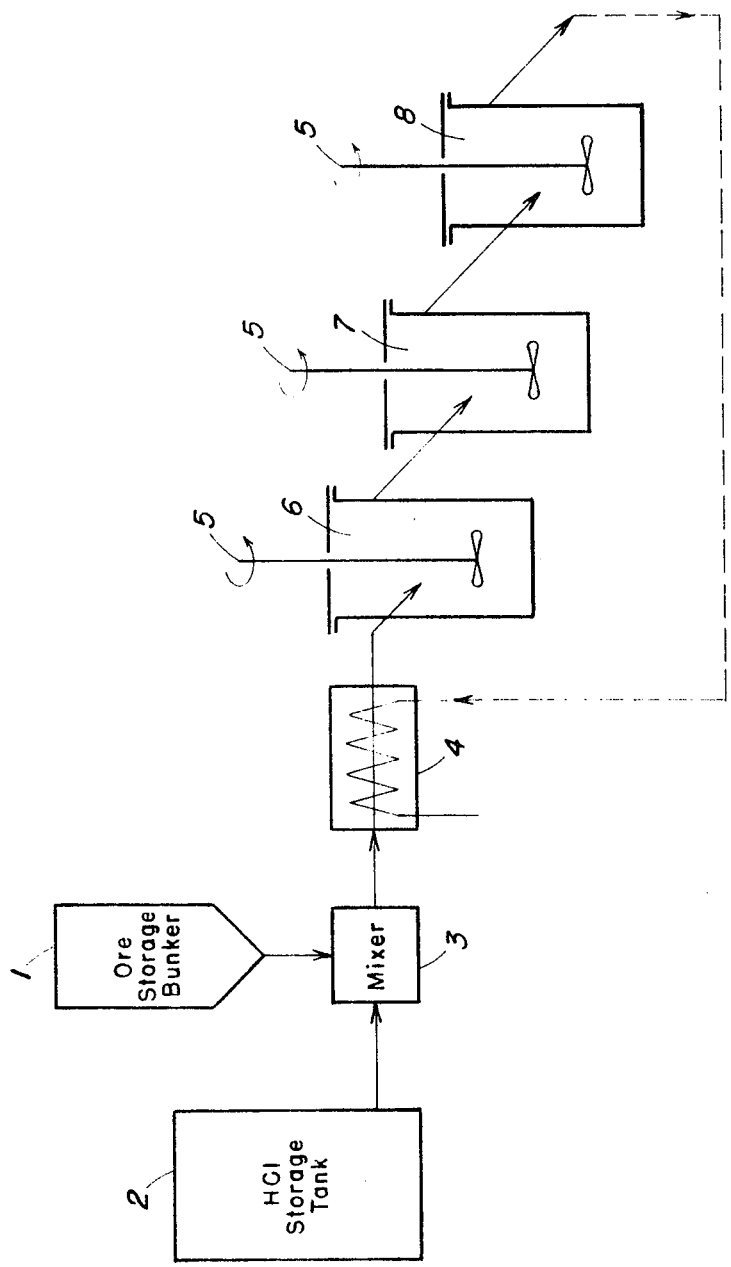

3,597,190
PROCESS FOR THE CONTINUOUS DIGESTION OF TITANIUM ORE BY MEANS OF HYDROCHLORIC ACID
Helmut Grohmann and Achim Kulling, Opladen, and Helmut Steinhausen, Odenthal, Germany, assignors to Titangesellschaft m.b.H., Leverkusen, Germany
Filed Apr. 14, 1969, Ser. No. 815,921
Claims priority, application Germany, May 11, 1968, P 17 67 449.6
Int. Cl. C01g 23/04
U.S. Cl. 75—1    8 Claims

ABSTRACT OF THE DISCLOSURE

The invention is concerned with a co-current process for the continuous digestion of titanium ores, especially ilmenite ores, using concentrated hydrochloric acid at elevated temperatures and at atmospheric pressure.

BACKGROUND OF THE INVENTION

The digestion of ores containing titanium sometimes referred to as titanium ores or titaniferous ores, by means of hydrochloric acid of over 32% at temperatures higher than 70° C., preferably higher than 90° C. is well known. In order to retard or prevent completely the hydrolysis of the titanium tetrachloride, which begins under these conditions, the digestion is carried out, according to German Pat. No. 1,083,244, in the presence of phosphorous pentoxide, phosphoric acid or their salts. An improvement over this process is described in German Pat. No. 1,216,271 wherein digestion is carried initially with a part only of the required hydrochloric acid and in such a way that the remaining amount of HCl is added in the cold state, depending on the heat liberated during the reaction. By this means an undesirable increase in the temperature of the reaction mass is avoided. Furthermore, according to German Pat. 1,216,272, it is possible to carry out the digestion continuously under the conditions stated by passing the hydrochloric acid through a bed of loosely heaped ore. Moreover, the Austrian application No. 1365/66 describes an advantageous modification of this continuous process wherein the hydrochloric acid is preheated outside the reaction vessel before being introduced therein and the desired digestion temperature therein is adjusted and maintained by variations of the current velocity and, as the case may be, by the controlled addition of cold hydrochloric acid.

However, common to all the prior art processes hereinabove mentioned is the necessity for carrying out the digestion in reaction vessels that are resistant to pressure. For this reason alone these processes appear to be hardly suitable for economical digestion on a large scale. Moreover, they are unsatisfactory for other reasons.

Thus the discontinuous digestion methods mentioned hereinabove are difficult to control as to temperature owing to the strongly exothermic nature of the reaction, particularly in large batches; and local overheating, which leads to uncontrollable hydrolysis, may be avoided only at great expense.

Also the countercurrent principle used in the aforementioned patented continuous digestion processes has the fundamental disadvantage that gangue materials and particles of hydrolyzed titanium dioxide may be removed from the reaction vessel only under such conditions that significantly large fractions of undigested ore are removed at the same time; and efforts to prevent the removal of the undigested ore have led to a concentration of gangue and hydrolyzed titanium dioxide in the reaction vessel. The removal of the hydrolyzed $TiO_2$ particles, the formation of which cannot be prevented at most cases, is, however, absolutely necessary since they may act as nuclei for furthering hydrolysis.

SUMMARY OF THE INVENTION

A process for the continuous digestion of titanium ores by means of concentrated hydrochloric acid has now been discovered wherein the disadvantages attending the processes of the prior art are avoided. Briefly the continuous digestion process of this invention is carried out at normal i.e. atmospheric pressure and as a continuous stream of intensely mixed ore-acid slurry flowing continuously from one reaction vessel to another of any desired number of reaction vessels connected in series. The reactants pass co-currently through the system with reaction temperatures steadily increasing from 65° to 105° C. Thus the ore and hydrochloric acid are first mixed together to form a slurry which is preheated to between 25 and 60° C. This preheated slurry is then introduced continuously into the first of the series of reaction vessels and is there partially brought to reaction. Due to the heat liberated by the reaction the temperature of the partially reacted ore-acid slurry is raised. This heated partially reacted slurry is continuously removed from the first reaction vessel and transferred into the next succeeding reaction vessel where the digestion reaction is continued at a self-adjusting reaction temperature which is higher, in comparison, to that in the preceding reaction vessel due to the continued reaction of the ore-acid slurry. The continuous flow of partially reacted slurry is thus continued from one succeeding reaction vessel to the next with the temperature of reaction steadily increasing to a maximum of 105° C. at which temperature the digestion is completed, whereupon the digestion solution so obtained is removed continuously from the last reaction vessel together with the remaining solid fraction.

The system employed for digestion consists preferably of any desired number of reaction vessels preferably two or four, connected in series and arranged in cascade relationship, each vessel being provided with stirring means for intensely mixing the slurry therein. Thus using the method of continuous digestion according to the invention it is possible to operate at atmospheric pressure since once the continuous digestion has strated additional concentrated hydrochloric acid-ore mixture is added directly to a considerable volume of acid-ore slurry which has already been partially reacted. As a consequence, part of the ore has been digested and hence a significant amount of the free acid is thus bound to the constituents of the ore in the form of chlorides and thereby consumed. The vapor pressure of the suspension thus remains below 760 mm. mercury in the entire system. For this reason it is not necessary that the reaction vessels be pressurized, it being quite sufficient to provide the covers of the reaction vessels with venting means only.

Losses of hydrochloric acid do not occur under these conditions. Moreover the fact that in each of the several reaction vessels only a fraction of the digestion reaction takes place has the additional advantage that in each reaction vessel only the corresponding amount of heat of reaction is released which is absorbed by the entire volume of slurry in the respective reaction vessel. In this way strong and suddenly occurring temperature increases are avoided, and this makes an essentially simplified and easily managed temperature control possible.

An additional characteristic of this continuous digestion process is seen in the reliable removal of gangue materials and, as the case may be, any titanium dioxide particles formed in the slurry. Thus due to the co-current flow of slurry and the high intensity mixing of the slurry in each reaction vessel none of these solids are permitted to accumulate in the reaction vessels and are completely discharged from the last reaction vessel in every case.

Further advantages of this continuous digestion process are the low costs of energy input. Except for the energy input for stirring, no additional energy need be added to the system once it is in operation. The slurry prepared by mixing fresh ore and hydrochloric acid may be preheated by application of the thermal energy derived from hot digestion solution discharged from the last reaction vessel. This preheated slurry is introduced into the first reaction vessel at a maximum temperature of 60° C. where it reacts partially, and owing to the exothermic nature of the reaction serves to heat up additional preheated ore-acid slurry being added continuously thereto. Similarly as the reaction proceeds in the next reaction vessel its temperature increases to a temperature higher than in the preceding one. Thus the reaction temperature increases from one reaction vessel to the next without the addition of external heat. The digestion temperatures occurring in the individual reaction vessels are controlled solely by the temperature of the fresh ore-acid slurry and by the velocity of through-put.

In order to avoid undesirable hydrolysis and thus loss of yield it is necessary to maintain the residence time in the individual reaction vessels as low as possible. It is well known that with increasing temperature and consequently increasing digestion velocity the tendency of the initially formed titanium tetrachloride to hydrolyze also increases. Hence according to the process of this invention the average total residence time in the digestion reaction vessels up to complete digestion is at maximum four hours, preferably one hour. During this time period no hydrolytic precipitation worth mentioning takes place even at the prevailing high temperatures. Local overheating, which would lead to uncontrollable hydrolysis, is prevented by intensive stirring.

Intensive stirring is absolutely necessary because this not only avoids an increase in concentration of solids in the reaction vessels but also increases the rate of digestion and produces a uniform residence time in the individual reaction vessels. It is also necessary that fractions of the slurry remain no longer than absolutely necessary in the reaction vessels owing to the tendency toward hydrolysis mentioned above.

According to this invention the hydrochloric acid employed for the digestion must contain at least 35% HCl, preferably more than 36%. At lower concentrations hydrolysis occurs. The amount of hydrochloric acid required depends on the composition of the ore. In respect to the formation of $TiCl_4$ it is generally possible to carry out the digestion with a deficiency of hydrochloric acid as well as with an excess of it, wherein an excess of acid facilitates further processing of the solution.

Ores that are suitable for the process according to this invention are preferably ilmenites.

DESCRIPTION OF DRAWINGS

The continuous digestion system of this invention is shown schematically in the drawing wherein the ore-acid slurry is fed continuously to three reaction vessels arranged in cascade relationship each having a stirrer.

DESCRIPTION OF PREFERRED EMBODIMENT

Referring to the drawing the ore is conveyed continuously from a storage bunker 1 into a mixer 3. Simultaneously concentrated hydrochloric acid is fed from the storage tank 2 into the mixer 3 in the acid to ore ratio required for digestion. The slurry prepared in the mixer 3 is fed into and through heat exchanger 4 where it is brought up to a maximum temperature of about 60° C. required prior to entry into the first reaction vessel 6. The heat exchanger 4 may be heated in any one of several ways i.e. electrically, by steam, by hot water or by recycling all or a portion of the digestion solution discharged from the last reaction vessel 8 as indicated by the dotted lines in the drawing. From the heat exchanger 4 the heated slurry is delivered into the first reaction vessel 6 fitted with a stirring device 5.

About 50–60% of the suspended ore goes into solution in this first reaction vessel. Owing to the liberated heat of reaction the temperature of the slurry increases from 60° C. to about 70–85° C. This slurry then cascades via an overflow into the second reaction vessel 7 which is also fitted with a stirrer 5. Here the temperature of the slurry increases to about 80–100° C. and a degree of digestion of from 60–90% is reached. In the third and last reaction vessel 8 the slurry cascading from the reaction vessel 7 is digested to completion. The temperature reached should amount to 105° C. maximum at which time about 97% of the ore originally present in the slurry has gone into solution. The digestion liquor so obtained flows out continuously from the reaction vessel 8 and may be processed further immediately or it may be conveyed in part, or wholly, through the heat exchanger 4 in order to utilize that heat energy for heating fresh ore-acid mixtures. At the same time the slurry is cascading from one reaction vessel to another all of the insoluble gangue materials and any hydrolytically produced nuclei of hydrated $TiO_2$ are carried along with the slurry and discharged from the digestion system and hence cannot accumulate in the reaction vessels. These undissolved or reprecipitated fractions are removed from the digest solution in the known manner by means of hydrocyclones, filters or the like, after which the clarified solution is reduced and cooled in the known manner to free it from the main portion of iron by crystallization of $FeCl_4 \cdot 4H_2O$. Subsequently the substantially iron-free solution obtained is subjected to hydrolysis in order to produce $TiO_2$ pigments.

The following example serves for further elucidation of the process:

EXAMPLE

The continuous co-current digestion was carried out in a system such as shown in the drawing. An electric flow-type heater made of glass with a heating rod of quartz served as the heat exchanger 4. The reaction vessels 6, 7, and 8 each had a capacity of 10 liters; each was fitted with a stirrer 5 and heating jacket and, in addition, each was well insulated.

The mixer 3 was charged with 38% hydrochloric acid from the storage tank 2 via a dosing pump and with ilmenite of the composition 45% $TiO_2$, 33.8% FeO, 12.3% $Fe_2O_3$ and 5.5% MgO from the storage bin 1 via a dosing screw conveyor. The amounts added per hour were 30 liters hydrochloric acid and 9.0 kg. ilmenite. The slurry prepared in the mixer 3 contained 126 g.p.l. $TiO_2$, in the form of ore, and was fed through the heat exchanger 4 where it was brought up to a temperature of 40° C. From the heat exchanger the slurry passed continuously into the reaction vessels 6, 7, and 8 filling each one successively in the order named.

The rate of feed was chosen such that all three reaction vessels were filled within about one hour at which time the ilmenite slurry started to discharge from the last reaction vessel 8. Without interrupting the continuous flow of slurry jacket heating was initiated until a temperature of 75° C. was reached in the first reaction vessel 6. At this point the jacket heating was stopped since it was not needed any more owing to the heat developed by the reaction of the ore and acid. Additional regulation of the temperature in the first reaction vessel was achieved by regulating the temperature of the fresh ore-acid slurry being continuously added thereto.

To this end the flow-type heater 4 was controlled by a contact thermometer in reaction vessel 6 and a relay which switched on the current each time the temperature in the reaction vessel 6 fell below 75° C. In general, it sufficed for maintaining this temperature when the slurry in the flow-type heater was heated to 30–40° C.

After continuing the flow of slurry for about 3 hours an equilibrium concerning temperature and degree of digestion was arrived at which remained for the duration of the continuous digestion process. At this time the temperature in the first reaction vessel was 75° C. and the amount of $TiO_2$ in solution was 68 g.p.l. which corresponded to a degree of digestion of 54%. The temperature in the second reaction vessel had risen to 92° C. and the amount of $TiO_2$ in solution was 110 g.p.l. corresponding to a degree of digestion of 87%. The temperature in the third reaction vessel was at 96° C. and 122 g.p.l. $TiO_2$ were in solution which amounted to a digestion yield of 97%. This solution was drawn off continuously and processed further in the known manner for the production of $TiO_2$ pigment.

While this invention has been described and illustrated by the example presented, it is not intended to be strictly limited thereto, and other variations and modifications may be employed within the scope of the following claims.

What is claimed is:

1. In a process for the continuous digestion of titaniferous ores in hydrochloric acid having an acid strength in excess of 35% the improvement comprising: mixing the ore and acid to form a slurry, preheating the slurry to a temperature of from 25 to 65° C., continuously feeding said preheated slurry co-currently to a plurality of reaction vessels arranged in succession, digesting the preheated slurry progressively in said reaction vessels by heating the continuously moving stream of slurry gradually from 65° C. to 105° C. while feeding said slurry from the first to the last of said successive reaction vessels, said gradual heating being effected by utilizing the heat developed in each of said successive reaction vessels by partial reaction of the ore-acid slurry therein, and vigorously stirring the slurry in each reaction vessel to continuously discharge all solid fractions together with the digestion solution from the last reaction vessel.

2. Process for continuously digesting a titaniferous ore in hydrochloric acid according to the improvement of claim 1 wherein the ore-acid slurry is partially reacted in each reaction vessel at substantially atmospheric pressure.

3. Process for continuously digesting a titaniferous ore in hydrochloric acid according to the improvement of claim 1 wherein reaction of the slurry is effected by heating the slurry in said successive reaction vessels for a period of time totaling from 1 to no more than 4 hours.

4. In a process for the continuous digestion of titaniferous ores in hydrochloric acid having an acid strength in excess of 35% the improvement comprising: mixing the ore and acid to form a slurry, passing said slurry through heating-means to preheat the slurry to a temperature of from 25 to 65° C., continuously feeding the preheated slurry co-currently to a plurality of reaction vessels arranged in succession, digesting the preheated slurry progressively in said reaction vessels by heating the continuously moving stream of slurry gradually from 65° C. to 105° C. while feeding said slurry from the first to the last of said successive reaction vessels, said gradual heating being effected by introducing the preheated slurry into the first reaction vessel and effecting a partial reaction of the ore-acid slurry therein at atmospheric pressure whereby the temperature of said partially reacted slurry is increased proportionately to the heat developed by the partial reaction of said slurry, overflowing said partially reacted slurry at said increased temperature from the first reaction vessel into the next succeeding reaction vessel and effecting further partial reaction of the ore-acid slurry therein at atmospheric pressure whereby the temperature of the slurry is again increased proportionately to the heat developed by further partial reaction of said slurry, and continuing the digestion of said continuously flowing stream of slurry in the manner aforesaid in succeeding reaction vessels, until the temperature of said slurry reaches a maximum of 105° C. at which temperature said slurry is completely digested, and vigorously stirring the slurry in each reaction vessel to accelerate the reaction of the ore-acid slurry and to continuously discharge all solid fractions together with the digestion solution from the last reaction vessel.

5. Process for continuous digestion of titaniferous ores according to the improvement of claim 4 wherein the slurry is cascaded continuously from one reaction vessel to the next succeeding reaction vessel.

6. Process for the continuous digestion of titaniferous ores in hydrochloric acid according to the improvement of claim 4 wherein heated digestion solution from said last reaction vessel is recycled to said heating means for preheating said slurry.

7. Process for continuously digesting a titaniferous ore in hydrochloric acid according to the improvement of claim 4 wherein reaction of the slurry is effected by heating the slurry in said successive reaction vessels for a period of time totaling from 1 to no more than 4 hours.

8. Process for the continuous digestion of titaniferous ores in hydrochloric acid according to the improvement of claim 4 wherein the digestion solution from the last reaction vessel is reduced, cooled and the iron values removed therefrom, and thereafter the substantially iron-free solution is hydrolyzed to precipitate the titanium values as hydrous titanium dioxide.

References Cited
UNITED STATES PATENTS

| | | | |
|---|---|---|---|
| 759,191 | 5/1904 | Rider | 75—101X |
| 2,804,375 | 8/1957 | Kamlet | 23—202 |
| 2,875,107 | 2/1959 | Daiger | 75—1X |
| 2,923,617 | 2/1960 | Kolflaath | 75—104X |
| 3,446,590 | 5/1969 | Michal et al. | 75—101X |
| 3,457,037 | 7/1969 | Aramendia et al. | 75—1X |
| 3,482,966 | 12/1969 | Orlandini et al. | 75—101 |
| 3,518,054 | 6/1970 | Kulling et al. | 75—1X |

ALLEN B. CURTIS, Primary Examiner

U.S. Cl. X.R.

23—202; 75—101